(12) United States Patent
Bick

(10) Patent No.: US 7,620,174 B1  
(45) Date of Patent: Nov. 17, 2009

(54) TOUCHPAD

(75) Inventor: Andrew Bick, Camberley (GB)

(73) Assignee: Nokia Corporation (FI)

( * ) Notice: Subject to any disclaimer, the term of this patent is extended or adjusted under 35 U.S.C. 154(b) by 1052 days.

(21) Appl. No.: 10/399,909

(22) PCT Filed: Oct. 24, 2000

(86) PCT No.: PCT/GB00/04100

§ 371 (c)(1),  
(2), (4) Date: Dec. 3, 2003

(87) PCT Pub. No.: WO02/35333

PCT Pub. Date: May 2, 2002

(51) Int. Cl.  
*H04M 1/00* (2006.01)  
*H04M 9/00* (2006.01)

(52) U.S. Cl. .................. 379/433.01; 379/433.04; 379/433.11; 379/428.01; 379/429; 455/575.1; 455/575.3

(58) Field of Classification Search .......... 379/433.13, 379/433.07, 368, 419, 433.01, 433.04, 429, 379/428.01, 433.11; 455/575.1, 575.3, 566, 455/90.3, 90.1, 90; 345/173; 348/14.09, 348/14.08

See application file for complete search history.

(56) References Cited

U.S. PATENT DOCUMENTS 4,066,853 A    1/1978  Zenk
5,715,524 A *  2/1998  Jambhekar et al. ........ 455/575.3
5,742,894 A *  4/1998  Jambhekar et al. ........ 455/575.3
5,841,469 A * 11/1998  Freeman et al. .......... 348/14.09
5,952,998 A *  9/1999  Clancy et al. ................ 345/173
6,020,878 A *  2/2000  Robinson ..................... 345/173
6,038,313 A *  3/2000  Collins ..................... 379/433.07
6,075,553 A *  6/2000  Freeman et al. .......... 348/14.08
6,118,436 A    9/2000  Kushita ....................... 345/173
6,332,084 B1* 12/2001  Shaanan et al. ............. 455/566
6,415,138 B2*  7/2002  Sirola et al. ................. 455/90.1
6,466,202 B1* 10/2002  Suso et al. ............... 455/575.3
6,573,886 B1*  6/2003  Lehtinen et al. ............. 345/173
6,639,586 B2* 10/2003  Gerpheide ................... 345/173
7,006,077 B1*  2/2006  Uusimaki ................... 345/173
2001/0012769 A1* 8/2001  Sirola et al. ................... 455/90
2002/0071550 A1* 6/2002  Pletikosa ............... 379/433.01

FOREIGN PATENT DOCUMENTS

FI          104928 B1   4/2000
GB         2 299 394   10/1996
GB         2 344 905    6/2000

\* cited by examiner

*Primary Examiner*—Thjuan K Addy  
(74) *Attorney, Agent, or Firm*—Alston & Bird LLP

(57) ABSTRACT

A portable electronic apparatus is disclosed. The apparatus has a body portion and input means in the form of a touchpad. The touchpad is movable between a first relative position where it operates in a first mode, and a second relative position where it operates in a second mode. The touchpad is capable of receiving input data from one or both of its operational surfaces, so providing greater flexibility.

16 Claims, 6 Drawing Sheets

TOUCHPAD

BACKGROUND OF THE INVENTION

This invention relates to a touchpad apparatus for use with a portable electronic device. It is particularly suitable for use in a portable communication device such as a portable telephone or wireless computer.

Portable telephones generally require a keypad so that a user can enter information, such as a telephone number to be dialed. However, with the ever increasing integration of advanced data facilities into portable telephones, there is often a need to provide a more advanced keypad than a simple numeric type. For instance, with the increasing use of mobile devices to access the Internet, it is desirable to provide some means of cursor control, such as is provided by a mouse or trackball in a PC environment.

With increases in data rates possible, and hence increases in the amount of data receivable by portable telephones, such telephones are increasingly being used in data browsing activities. It is convenient to offer a larger display to enable such received data to be comfortably and easily viewed by the user.

Both these requirements, of more advanced keypads and larger displays, directly conflict with consumer demands for smaller portable telephones.

One attempt to solve this problem was the telephone jointly developed by Alcatel® and Sharp®. The telephone was marketed by each company under the names OneTouch Com and MC-G1 respectively. The telephone 100 is shown at FIG. 1, and comprises many of the features normally associated with portable telephones: antenna 110, loudspeaker 120, display 130, microphone 140, and control keys 150. The notable difference between this telephone and previous portable telephones is the absence of a numeric keypad for entering telephone numbers.

This function is achieved through the provision of a touchscreen which is integrated with the display 130. In order to access the touchscreen, the rotating protective cover 160 must be opened (see FIG. 2) to expose the touchscreen surface, and allow the user to input commands and data using a stylus.

In normal use, when the cover 160 is closed, the display 130 can be seen through a transparent portion in the cover. However, in order to access any of the advanced functions of the telephone, the cover must be opened, the stylus must be removed from its holder in the telephone, and the user must operate the touchscreen to choose the option(s) he requires. No input via the touchscreen is possible with the protective cover in place.

The touchscreen in this telephone is of the resistive type. The operation of such a touchscreen will be well known to the skilled man, and so is not described in any detail here. It is sufficient to know that the display comprises a relatively large glass element, which is why the rotating cover 160 is necessary in order to protect the touchscreen and display from inadvertent damage.

One drawback with such a touchscreen system is that when entering data, the user obscures the display with his own hand.

SUMMARY OF THE INVENTION

According to a first aspect of the present invention, there is provided a portable electronic apparatus comprising a body portion and input means in the form of a touchpad, wherein the touchpad is movable between a first relative position where it operates in a first mode, and a second relative position where it operates in a second mode.

According to a second aspect of the present invention, there is provided a touchpad apparatus for inputting data, comprising two operational surfaces arranged such that a user may use an operational surface for data entry.

The portable electronic apparatus comprises a body portion, which preferably houses a display element. The display element may be an LCD type display, a plasma type display, or any other suitable display device.

The portable electronic apparatus is preferably a portable telephone. The telephone may operate according to any one or more applicable standard, such as GSM, EDGE, HSCSD or WCDMA.

The touchpad is preferably arranged to be substantially transparent or light permeable. In this way, the touchpad may be positioned to overlay the display, thus allowing the instructions on the display to be acted on directly by touching the touchpad above the appropriate part of the display.

The touchpad is preferably movable between the two positions via use of a hinge mechanism. Alternatively, a slide mechanism may be utilised to similar effect.

In a preferred embodiment, the hinge mechanism is located at the bottom of the apparatus, but it may be conveniently located at the top, or at either side of the apparatus.

In the open configuration, corresponding to the second position, the touchpad is located away from the display. In this mode of operation, the touchpad is operable in a manner similar to a mouse in a regular computer. In this way, a user of the apparatus can move a cursor across the display by moving his finger across the touchpad in a corresponding fashion.

In one embodiment, the touchpad may be arranged so that it flips all the way round the apparatus and comes to rest on the rear surface of the apparatus i.e. the surface directly opposing the surface housing the display. In this way, the user of the apparatus may able to operate the apparatus using only a single hand.

Preferably, the type of touchpad used is a capacitive touchpad. Advantages of the invention may be realised through the use of other types of touchpad, particularly resistive touchpads.

In order to accommodate the touchpad on bodies of different shapes and configurations, the touchpad may be configured to be non-planar, e.g. curved. The touchpad can also be configured to be take a range of different shapes. Regular touchpads are rectangular, but there is no such restriction on the touchpad of the invention.

Advantageously, in the second position, the touchpad is arranged so that it has two exposed surfaces, generally opposing each other. Each surface is available to the user for data entry. In one embodiment, the user may enter data using either surface of the touchpad. This may come down to a matter of personal preference, or be influenced by the dexterity of the user.

In an alternative advantageous embodiment, it is possible to enter data simultaneously using both surfaces of the touchpad. In this way, the user may enter one type of data using the first surface, and a second type of data using the second surface. Controller circuitry in the apparatus is able to distinguish between data entries on first and second surfaces.

BRIEF DESCRIPTION OF THE DRAWINGS

For a better understanding of the present invention, and to understand how the same may be brought into effect, the invention will now be described, by way of example only, with reference to the appended drawings in which.

DETAILED DESCRIPTION OF THE INVENTION

Figure 1:
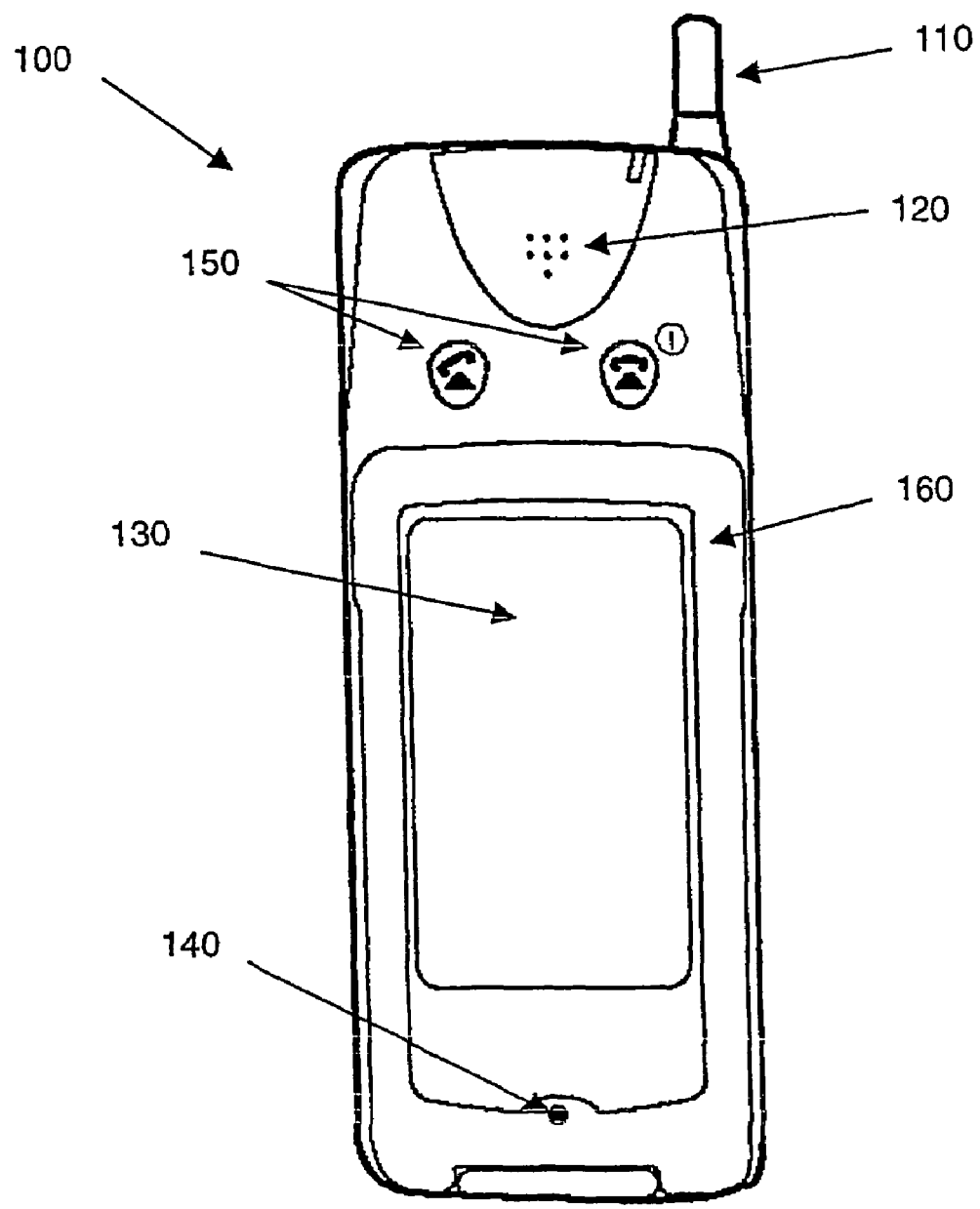
FIG. 1 shows a prior art telephone utilising a resistive-type touchscreen.
Figure 2:
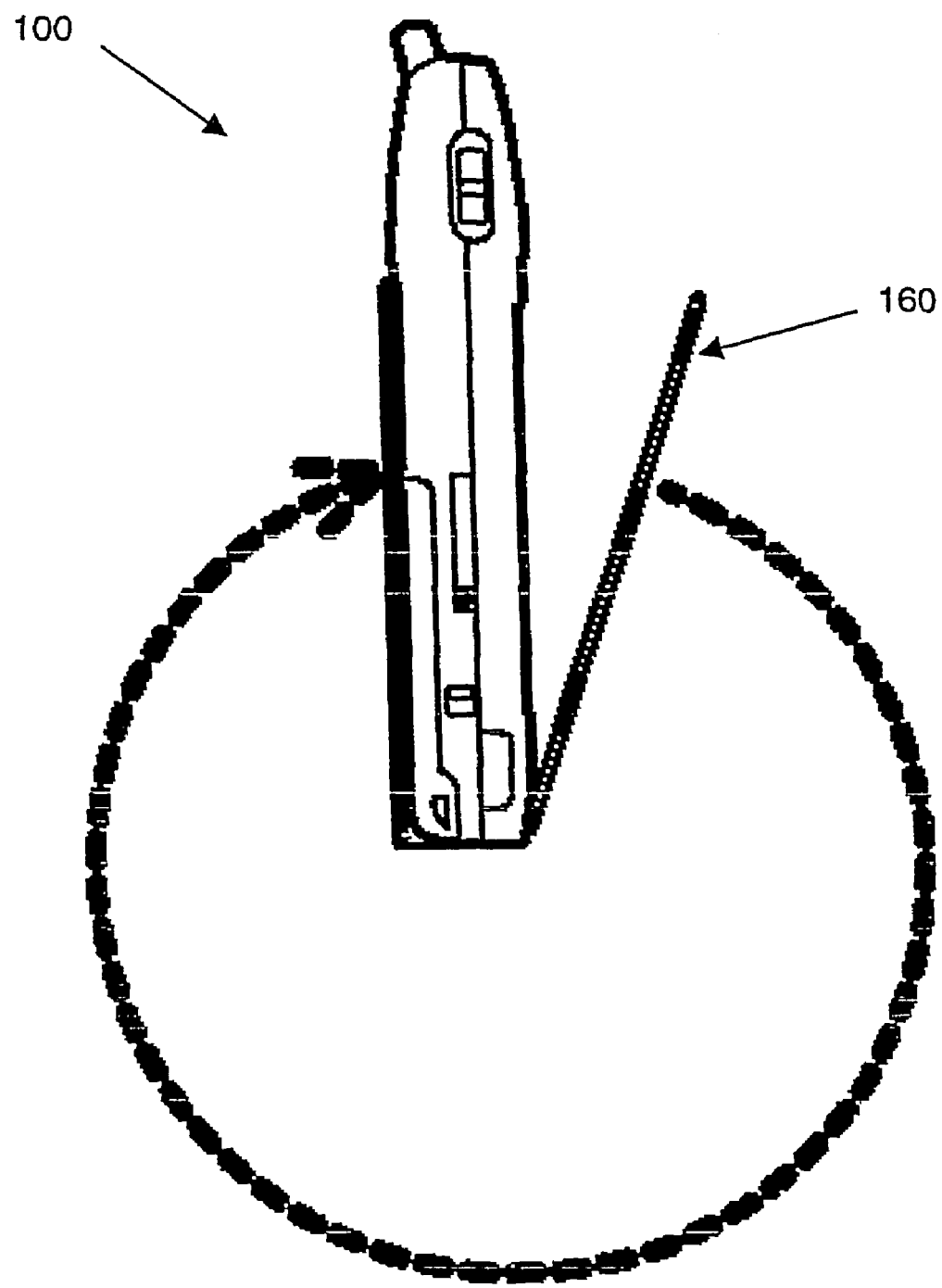
FIG. 2 shows the operation of the protective cover of the telephone of FIG. 1.
Figure 3:
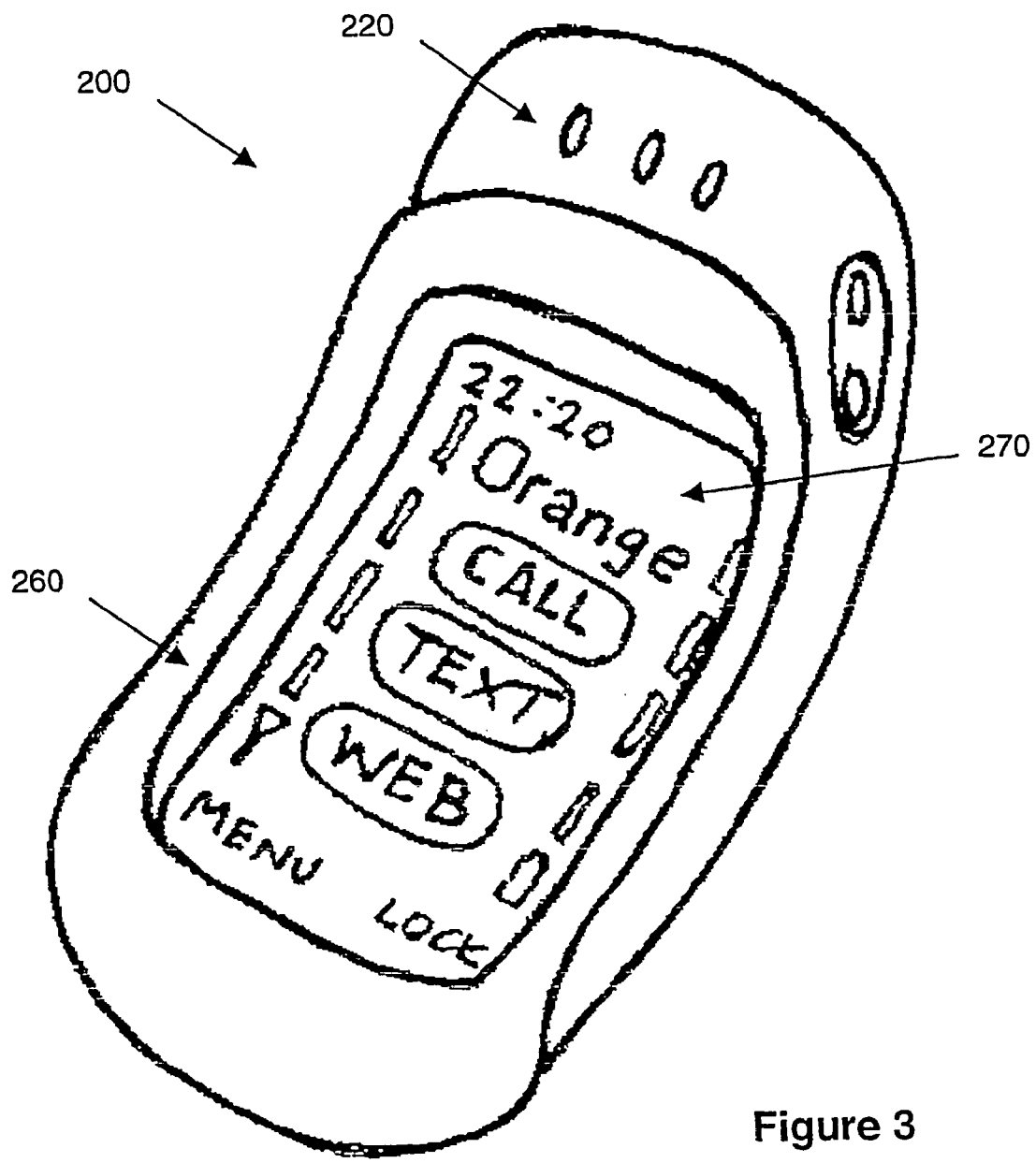
FIG. 3 shows a portable telephone according to an embodiment of the invention in a closed configuration.

FIG. 3 shows a portable telephone according to an embodiment of the invention. It has several components in common with the prior art telephone of FIG. 1, and like reference numbers have been used where appropriate.

Figure 4:
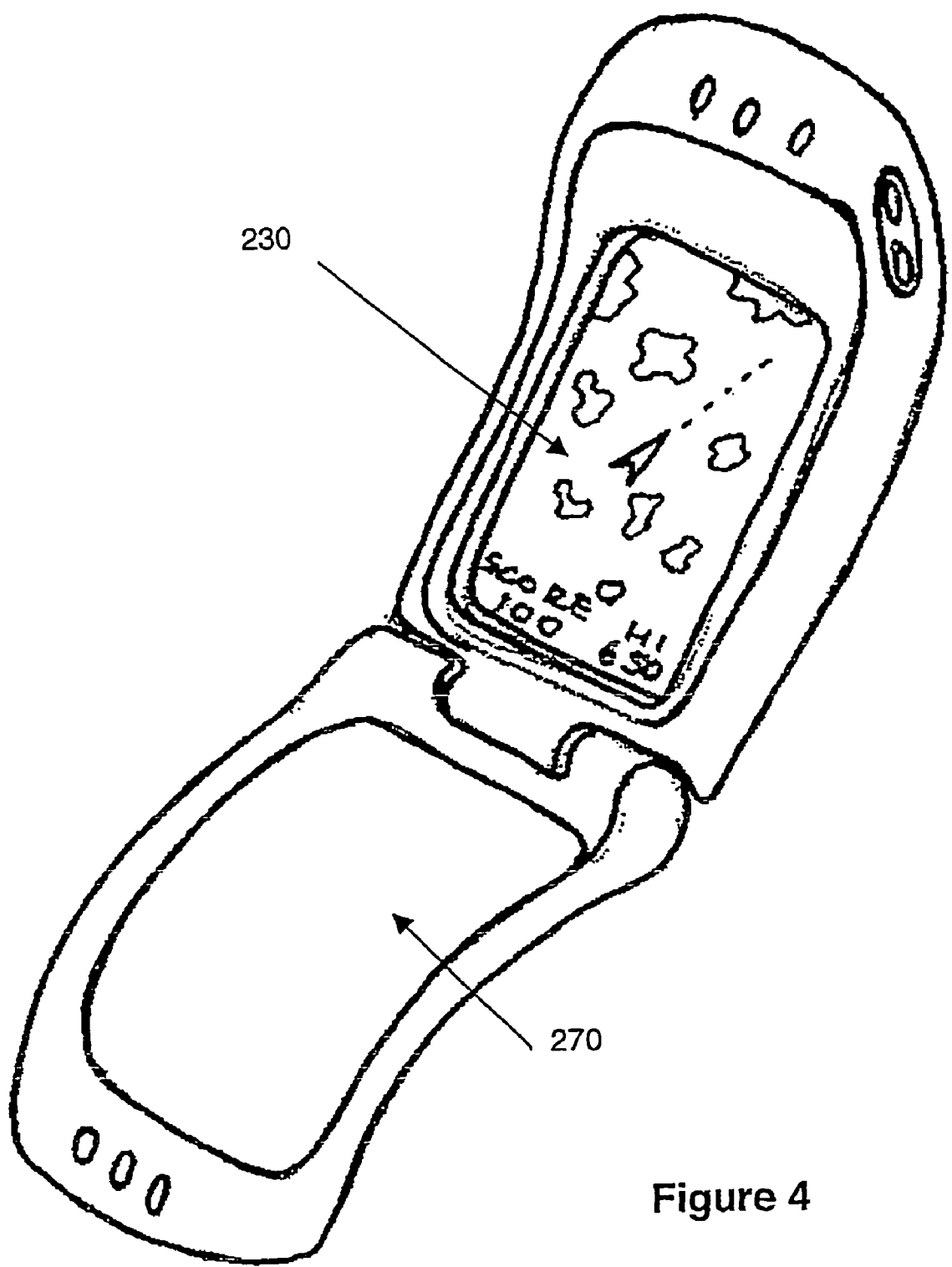
FIG. 4 shows a portable telephone according to an embodiment of the invention in an open configuration.

FIG. 3 shows the telephone in the closed configuration, which is to be compared to the open configuration of the same telephone shown in FIG. 4.

In the closed configuration, the display is visible behind cover 260, through a substantially transparent window 270. Window 270 is in fact a touchpad, and is sensitive to user input via the user's finger.

The touchpad of this particular embodiment does not require a stylus, as it relies on a different mode of operation to the previously described prior art telephone. This embodiment utilises a capacitive touchpad, rather than a resistive touchscreen. The mode of operation of such a touchpad will be well known to the skilled man, but a brief summary is now presented for completeness.

A voltage is applied to the corners of the touchpad. Conducting electrodes criss-cross the touchpad and establish a uniform voltage field across the touchpad. If the user touches the pad with his finger, then the field is disturbed. This disturbance results in a current being drawn from each edge of the touchpad in proportion to the distance of the finger from the edge. By monitoring the current flows, a controller circuit can calculate the x-y co-ordinates of the finger, and act further upon this information.

In the closed configuration of FIG. 3, the cover 260, containing the touchpad 270, is positioned to overlay the display 230. The touchpad, although substantially transparent, or light permeable, is not an ideal transmitter of light, and so a certain amount of display degradation is experienced.

However, for most purposes, particularly with a backlit display, the user should not experience a problem with intelligibility of the displayed data.

In the example display shown at FIG. 3, the user is able to access certain key functions directly from the touchpad. In this example, these are CALL, TEXT or WEB. In order to access any one of these functions, the user simply needs to touch the touchpad above the area indicated on the display. For instance, if the user decides to make a telephone call, he simply touches the touchpad above the CALL icon, and he will be presented with a further screen as shown in FIG. 5.

Figure 5:
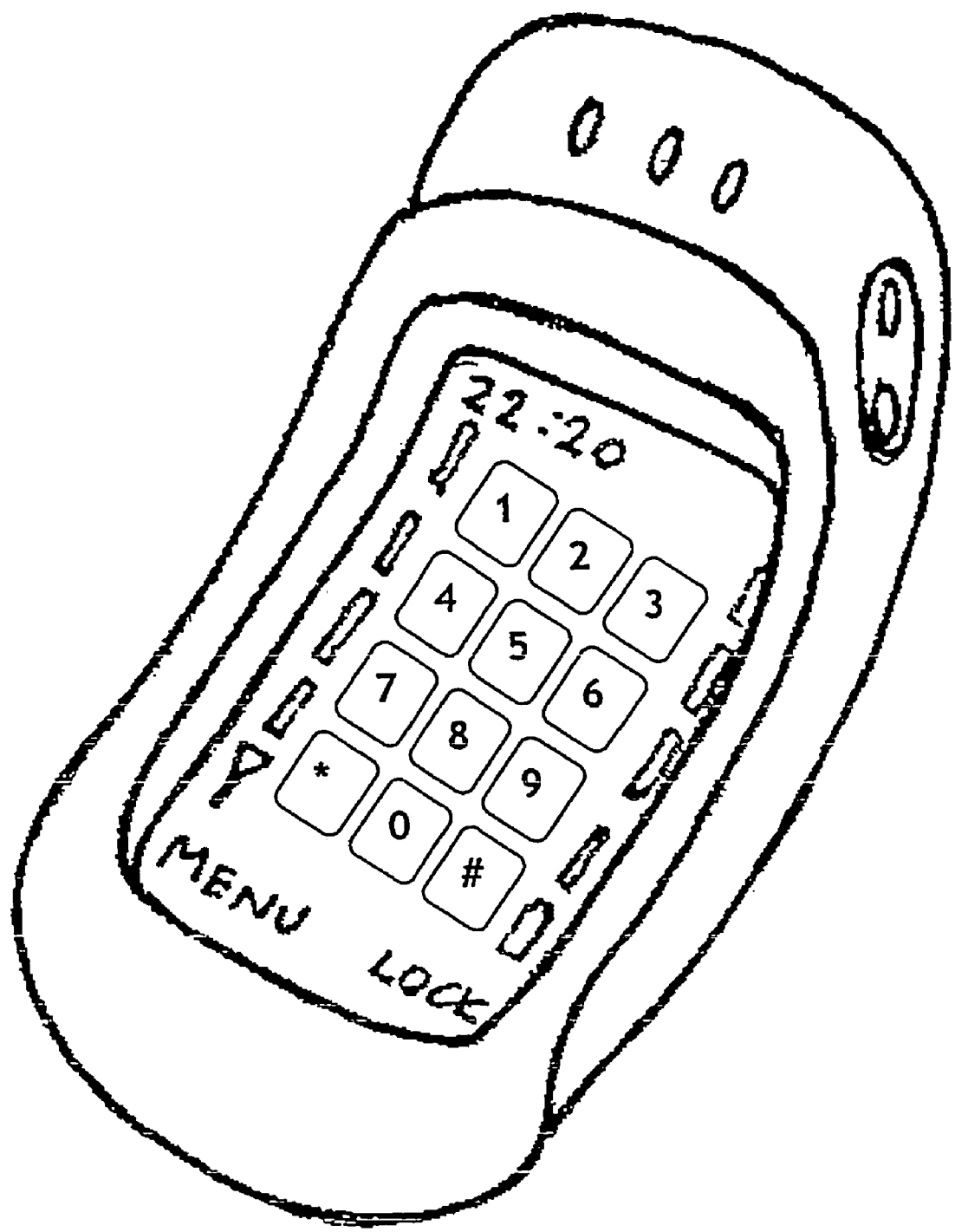
FIG. 5 shows the telephone of FIG. 3 having an alternative display configuration.

The view of the telephone in FIG. 5 shows a screen resembling a regular telephone keypad, and comprises keys for numerals 0-9, * and # as is normal in portable telephones. To dial a given number, the user simply touches the touchpad above each respective digit. The touchpad controller interprets the data concerning current flow, and so can calculate which area of the touchpad has been activated, and hence which numeral on the display has been input by the user.

In order to indicate to the user that a key press has been recognised, the display may be configured to briefly flash or invert the colours of a selected digit. In addition, or alternatively, a brief audible tone may be generated.

For use as a regular telephone, such utilisation of the touchpad is quite acceptable. However, when using the telephone in a graphics-rich mode, such as game-playing, or a data mode, for instance to access the World Wide Web (WWW) or Internet, it will be inconvenient for the user to obscure the display with his own hand, for example, while controlling a game character, or activating links in a received web page.

An additional problem with such activities may be that the relatively low light levels of colour LCD displays will be further attenuated by passing through the touchpad.

These problems can be mitigated by arranging the telephone into the relatively open configuration shown in FIG. 4. In this configuration, the cover 260 has been moved away from the display, by means of a hinged connection at the base of the telephone. This configuration allows the user to see the display 230 directly.

The telephone is equipped with a switch or sensor to detect whether the cover is open or closed, and so interpret input from the touchpad accordingly. A switch may be concealed in the hinge mechanism, or a simple magnet and reed-switch arrangement situated at the top of the cover, away from the hinge, can be used.

In this configuration, the touchpad 270 is arranged to be operable by its major surface opposed to the surface exposed in the closed configuration of FIG. 3. In the previously described closed configuration, the front surface of the touchpad was accessible to the user, and he was able to enter data that way. In this configuration, the opposite surface of the touchpad is accessible to the user, and situated directly below the display.

In this mode of operation, there is no text visible through the touchpad to guide the user. The type of data entry most suitable to this mode of operation is therefore similar to the type of data entry achievable through use of a mouse with a PC. i.e. the user may, through moving his finger about the surface of the touchpad, be able to steer a cursor or other graphic element, such as a game character, about the display 230.

In the example shown at FIG. 4, the phone is functioning to play a video game. In such a mode, it would be very inconvenient if the user had to operate controls defined by areas of the display (as in FIG. 3), as his hand would obscure the action of the game. In this instance, it is preferable to control the action with controls situated away from the display. This is possible in the configuration of FIG. 4.

In a further enhancement, it is possible to operate the touchpad such that each major surface of the touchpad is operable to independently receive user input. As has already been described, both surfaces of the touchpad are arranged to receive user input. In the first mode, however, only one surface is exposed. In the second mode, both surfaces are exposed and may be used for user input. In this mode, no distinction is made between input from each of the two surfaces. The user could therefore control the operation of the apparatus equally from either side of the touchpad. Thus, some users may find it easier to enter data using a first surface, and some may find it easier to enter data using the opposite surface.

In a still further enhancement, it is possible to interpret from which of the two operational surfaces user input is derived, thus enabling both surfaces to be used simultaneously to control different aspects of the operation of the device. This can be done by sensing not only the current flow due to the disturbance in the capacitive field, but also the direction of current flow within the touchpad. This gives an indication of whether the first or second surface has been used for user input. An example of an application which would benefit from such input means is use of the telephone apparatus to view a map which has been downloaded from a remote source. Using one surface of the touchpad, the user is able to pan or scroll around the map to locate a point of interest. Using the opposite surface of the touchpad, the user is able to zoom in and out to view varying levels of detail.

As an alternative to the above embodiment, it is possible to provide two separate touchpad elements separated by an insulating sheet. Each touchpad would then correspond with a respective operational surface of the touchpad element, and could be interpreted independently.

Figure 6:
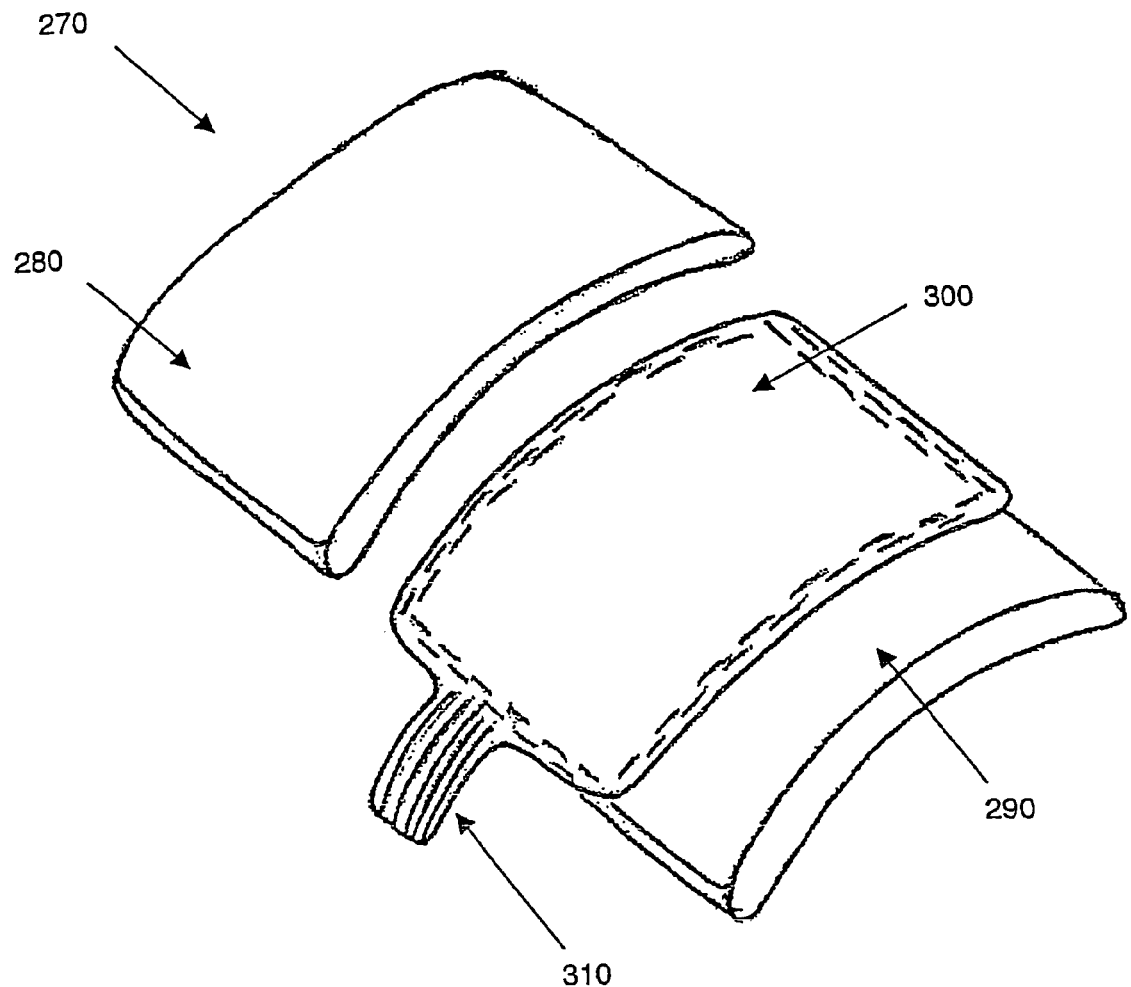
FIG. 6 shows an exploded view of the construction of the touchpad from the telephone of FIGS. 3 and 4.

FIG. 6 shows details of the construction of the touchpad 270. It comprises a functional membrane 300 which is encapsulated between two protective layers 280, 290. The functional membrane comprises a flexible plastics material such as polyester and is provided with an electrically conductive matrix on its surface or surfaces. The matrix may suitably be provided using a conductive material such as Indium Tin Oxide, which is capable of being very finely deposited on the surface of the membrane in such a way that the membrane's ability to transmit light is impaired as little as possible. Sputter coating may be used to deposit the conductive material.

The matrix is electrically connected to a controller in the main body of the telephone using a connector 310.

The protective layers are rigid transparent plastics material. They are positioned so as to sandwich the membrane 300 between them, allowing only the connector 310 to emerge. To ensure that the encapsulation is complete, the protective layers are constructed to be longer and wider than the membrane, so that a suitable bond can be provided around the outer edge of the complete touchpad 270. A suitable bond may be achieved using ultrasonic welding, or by use of an adhesive compound.

An alternative construction method utilises injection moulding technology to encapsulate the polyester film.

Once complete, and integrated into the cover 260, the touchpad is sealed against environmental damage from moisture or dust.

In the embodiment shown, the touchpad 270 is constructed to be curved, and so provide a more pleasing appearance to the user.

In alternative embodiments, it is possible to construct a touchpad which does not have straight or regular edges. Traditional touchpads have been rectangular in shape, but more complex shapes such as ovals are also possible.

In an alternative embodiment, the touchpad may be configured to rotate almost a full 360° and so rest against the rear surface of the telephone. In this configuration, the touchpad is positioned substantially opposite the display on the rear surface of the telephone. In certain applications, and particularly in one-handed use, this may facilitate greater ease of user input.

In summary, the telephone may be kept in the closed configuration for the majority of the time. The durable touchpad protects the more delicate display, while still allowing the display to be seen, and most functions of the telephone to be used.

When the user wishes to access web pages, play games, or otherwise operate the telephone in a non-traditional-telephone manner, it is possible to move the touchpad away from the display, and enter user data with the touchpad remote from the display. In this way, the user is offered an unimpeded view of the display, both in terms of direct vision without the touchpad intervening, and in terms of being able to keep his fingers away from the display.

In the light of the foregoing description, it will be clear to the skilled man that various modifications may be made within the scope of the invention. In particular, the touchpad has been described as being hingedly connected to the main body of the telephone, allowing it to be flipped away from the display into an open configuration. Another embodiment of the invention has the touchpad sliding away from the display into an open configuration.

In either the flip or the slide embodiments described, the touchpad is movable into a position below the display. It is equally possible to construct a device such that the touchpad flips or slides to one or other or both sides of the display.

The specific examples discussed have used a capacitive touchpad. The skilled man will understand that benefits of the invention may be realised through the use of a resistive touchpad, and the invention is not to be considered limited to a capacitive touchpad.

The present invention includes any novel feature or combination of features disclosed herein either explicitly or any generalisation thereof irrespective of whether or not it relates to the claimed invention or mitigates any or all of the problems addressed.

The invention claimed is:

1. A portable electronic apparatus comprising a body portion, and an input component in the form of a touchpad, wherein the body portion comprises a display and the touchpad is arranged so as to be substantially light permeable and is movable between a first relative position where it overlays the display and operates in a first mode that enables user input via the touchpad, and a second relative position where it does not overlay the display and operates in a second mode that enables user input via the touchpad.

2. A portable electronic apparatus as claimed in claim 1, wherein the touchpad is movable between the first and second positions by a hinge mechanism.

3. A portable electronic apparatus as claimed in claim 2, wherein the hinge mechanism is arranged along a side of the apparatus.

4. A portable electronic apparatus as claimed in claim 1, wherein in the first mode, a discrete region of the touchpad arranged for user input corresponds to a displayed item at a given region of the display.

5. A portable electronic apparatus as claimed in claim 1, wherein in the second mode, the touchpad is arranged to receive user input so that relative motion across the touchpad is translated into a corresponding relative motion of a displayed element on the display.

6. A portable electronic apparatus as claimed in claim 1, wherein the first and second positions correspond to respective extremes of movement of the touchpad.

7. A portable electronic apparatus as claimed in claim 1, wherein the second position corresponds with the touchpad being positioned such that the touchpad and the display occupy opposing surfaces of the apparatus.

8. A portable electronic apparatus as claimed in claim 1, wherein the touchpad is a capacitive touchpad.

9. A portable electronic apparatus as claimed in claim 1, wherein the touchpad is arranged to be non-planar.

10. A portable electronic apparatus as claimed in claim 1, wherein the touchpad is arranged to be rectangular.

11. A portable electronic apparatus as claimed in claim 1, wherein in the second position, two surfaces of the touchpad are exposed for user input.

12. A portable electronic apparatus according to claim 11, wherein each surface of the touchpad is operable independent of the other to generate user input.

13. A portable electronic apparatus according to claim 11, wherein both surfaces of the touchpad are operable simultaneously to generate user input.

14. A portable electronic apparatus as claimed in claim 1, wherein the apparatus is a telephone.

15. A portable electronic apparatus comprising a body portion, and an input component in the form of a touchpad, wherein the body portion comprises a display and the touchpad is arranged so as to be light permeable and is movable between a closed configuration where it overlays the display and operates in a mode corresponding to the closed configuration that enables user input via the touchpad, and an open configuration where it does not overlay the display and operates in a mode corresponding to the open configuration that enables user input via the touchpad.

16. A portable electronic apparatus comprising a body portion, and a touchpad for user input, wherein the body portion comprises a display and the touchpad is arranged so as to be substantially light permeable and is rotatable between a first relative position where it overlays the display and operates in a first user input mode that enables user input via the touchpad, and a second relative position where it does not overlay the display and operates in a second different user input mode that enables user input via the touchpad.

* * * * *

UNITED STATES PATENT AND TRADEMARK OFFICE
CERTIFICATE OF CORRECTION

PATENT NO. : 7,620,174 B1　　　　　　　　　　　　　　　　　　　　　　　Page 1 of 1
APPLICATION NO. : 10/399909
DATED : November 17, 2009
INVENTOR(S) : Andrew Bick It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1309 days.

Signed and Sealed this

Twenty-sixth Day of October, 2010

David J. Kappos
*Director of the United States Patent and Trademark Office*